United States Patent
Klein et al.

(10) Patent No.: US 8,000,875 B2
(45) Date of Patent: *Aug. 16, 2011

(54) METHOD AND DEVICE AS WELL AS COMPUTER PROGRAM FOR CONTROLLING AN INTERNAL COMBUSTION ENGINE

(75) Inventors: Eberhard Klein, Plochingen (DE);
Georg Mallebrein, Korntal-Muenchingen (DE);
Gholamabas Esteghlal, Stuttgart (DE);
Patrick Hochstrasser, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 1413 days.

This patent is subject to a terminal disclaimer.

(21) Appl. No.: 10/502,430

(22) PCT Filed: Sep. 12, 2002

(86) PCT No.: PCT/DE02/03408
§ 371 (c)(1),
(2), (4) Date: Sep. 24, 2007

(87) PCT Pub. No.: WO03/062633
PCT Pub. Date: Jul. 31, 2003

(65) Prior Publication Data
US 2008/0208430 A1      Aug. 28, 2008

(30) Foreign Application Priority Data
Jan. 22, 2002   (DE) .................................. 102 02 437

(51) Int. Cl.
*F02D 45/00*   (2006.01)
*G06F 19/00*   (2011.01)

(52) U.S. Cl. ........................................ 701/102; 701/115
(58) Field of Classification Search .................. 701/102, 701/101, 110, 111, 115; 123/480, 406.23, 123/350, 352, 436
See application file for complete search history.

(56) References Cited

U.S. PATENT DOCUMENTS

| | | | |
|---|---|---|---|
| 5,558,178 | A | 9/1996 | Hess et al. |
| 5,692,471 | A | 12/1997 | Zhang |
| 5,832,897 | A | 11/1998 | Zhang |

(Continued)

FOREIGN PATENT DOCUMENTS

DE            42 39 711            6/1994

(Continued)

OTHER PUBLICATIONS

Fischer et al., *Efficient Application of Engine Control Functions for Spark-ignition Engines*, Journal of Engine Technology, Stuttgart, Germany, vol. 61, No. 9, Sep. 2000, pp. 562-564, and 566-570.

*Primary Examiner* — Hieu T Vo
(74) *Attorney, Agent, or Firm* — Kenyon & Kenyon LLP

(57) ABSTRACT

A method and a device as well as a computer program for controlling an internal combustion engine are provided, a torque model being used within the framework of calculating instantaneous variables and/or actuating variables. A correction of a basic value determined under standard conditions takes place in the process. In addition, to further improve the accuracy of the model, the efficiency for the conversion of the chemical into mechanical energy by which the optimum torque value is corrected, is determined at least as a function of a variable characterizing the combustion center point and a variable characterizing the opening instant of a discharge-side gas-exchange valve.

18 Claims, 4 Drawing Sheets

U.S. PATENT DOCUMENTS

| | | |
|---|---|---|
| 6,205,973 B1 | 3/2001 | Bauer et al. |
| 7,051,710 B2 * | 5/2006 | Hochstrasser et al. ........ 701/111 |
| 7,530,220 B2 * | 5/2009 | Miller et al. ................. 701/115 |
| 7,654,248 B2 * | 2/2010 | Buslepp et al. ............... 123/436 |

FOREIGN PATENT DOCUMENTS

| | | |
|---|---|---|
| DE | 43 18 504 | 10/1994 |
| DE | 195 45 221 | 6/1997 |
| DE | 197 45 682 | 4/1999 |
| DE | 101 49 477 | 4/2003 |
| JP | 3064646 | 3/1991 |
| JP | 11315749 | 11/1999 |
| JP | 2000127807 | 5/2000 |
| JP | 2001159323 | 6/2001 |
| WO | 95 24550 | 9/1995 |

* cited by examiner

METHOD AND DEVICE AS WELL AS COMPUTER PROGRAM FOR CONTROLLING AN INTERNAL COMBUSTION ENGINE

FIELD OF THE INVENTION

The present invention is directed to a method and a device as well as a computer program for controlling an internal combustion engine.

BACKGROUND INFORMATION

To control an internal combustion engine, it is known from German Published Patent Application No. 42 39 711 (U.S. Pat. No. 5,558,178) to convert a setpoint value for a torque of the internal combustion engine into an actuating variable for influencing the air supply to the combustion engine, to set the ignition angle and/or to suppress or connect the fuel supply to individual cylinders of the internal combustion engine. In addition, the controlling of the fuel/air ratio to realize the predefined torque value is also known from PCT Publication No. 95/24550 (U.S. Pat. No. 5,692,471). Furthermore, in the known approaches the actual torque of the internal combustion engine is calculated taking the actual engine settings into account (charge, fuel metering and ignition angle). Among others, the engine speed, load (air mass, pressure etc.) and possibly the exhaust-gas composition are utilized.

In the context of these calculations, a torque model for the internal combustion engine is used, which is utilized both for determining the actuating variables and also for ascertaining the actual values. The essence of this model is that values for an optimum torque of the internal combustion engine and for an optimum ignition angle are determined as a function of operating points, which are then corrected via efficiency values in accordance with the actual setting of the internal combustion engine.

To optimize this model, it is known from German Published Patent Application No. 195 45 221 (U.S. Pat. No. 5,832,897) to correct the value for the optimum ignition angle as a function of variables influencing the efficiency of the internal combustion engine such as exhaust-gas recirculation rate, engine temperature, intake-air temperature, valve-overlap angle, etc.

In practice, however, it has been discovered that this known approach may yet be optimized further, especially with respect to simplifying the application, optimizing the computing time and/or considering the working-point dependency of the correction of the optimum ignition angle, especially the dependency on the inert-gas rate. In some operating states, in particular, the known torque model does not deliver satisfactory results. Such operating states are especially states with high inert-gas rates, i.e., states having a large proportion of inert gas (by external or internal exhaust-gas recirculation), which are caused by an overlap of intake and discharge-valve opening times and, above all, with small to medium fresh-air charges. Furthermore, these are operating states having high charge movements. Since these effects are not fully taken into account, the calculated basic variables make it impossible for the known procedure to obtain a precise torque calculation.

Another problem is that the known model, while taking the essential influences on the ignition angle into account when determining the maximum torque, does not consider the different slopes of the correlation between ignition angle and the maximum engine torque which is able to be attained with different mixtures in the instantaneous operating point of the engine. In optimizing the known model, a compromise must thus be found, which usually consists in the optimum ignition angle no longer coinciding with the ignition angle of the optimum torque. For example, in mixtures having good combustibility, which have a highly retarded ignition angle when generating the best torque, the optimum ignition angle is markedly more retarded than this ignition angle, whereas, in mixtures having poor ignitibility, it is considerably more advanced than the ignition angle at which the maximum torque is generated. This characteristic is sketched in FIG. 3. The dashed line there represents the curve provided by optimizing the known model. As can be seen, the actual and the model curve no longer correspond precisely. In one example of application, a resulting torque fault of up to 20% relative to the optimum torque $MI_{opt}$ has come about at the best possible optimum ignition angle.

Thus, it is obvious that the greater the variation in the steepness of the ignition hook (correlation between optimum ignition angle $ZW_{opt}$ and torque MI with respect to top dead center of ignition phase ignition-TDC for an operating point of the engine), the greater the deviation between the optimum ignition angle and the maximum ignition angle at which maximum torque is attained in mixtures that combust extremely well and those that combust poorly, and the greater the errors of the torque model. The known optimizer of the model parameters is unable to find a population of the model, in particular the optimum ignition angle, so that the torque model has low tolerance across the entire ignition-angle range.

As a result, the torque model must be optimized further, in particular with respect to engine-control systems having high inert-gas rates, such as engine-control systems having variable valve timing and/or charge-movement flap.

From the not pre-published German Patent Application No. 101 49 477.7, a method and a device as well as a computer program for controlling an internal combustion engine are known, a torque model being used within the framework of calculating instantaneous variables and/or actuating variables. In doing so, a basic value ascertained under standard conditions is corrected as a function of the inert-gas rate and/or the valve-overlap angle. Moreover, to further improve the precision of the model, the efficiency of the conversion of the chemical into mechanical energy by which the optimum torque value is corrected is determined as a function of the deviation between an optimum ignition angle and an instantaneous ignition angle as well as an additional variable that represents the combustion performance of the mixture, the latter being the optimum ignition angle in this case.

SUMMARY OF THE INVENTION

The method according to the present invention, the device according to the present invention, the computer program according to the present invention and the computer-program product according to the present invention, having the features of the independent claims, have the advantage over the related art that the efficiency of the conversion of the chemical energy into mechanical energy is determined at least as a function of a variable characterizing the combustion center point and a variable characterizing the opening instant of a discharge-side gas-exchange valve. In this way, the reduction of the indicated engine torque associated with an advanced opening of the discharge-side gas-exchange valve, is taken into consideration in the torque model. As a result, it is possible to achieve high accuracy in the indicated engine torque, calculated by means of the torque model, even with discharge valves having highly advanced opening. This makes it possible to improve, especially simplify, the application of the torque model.

Advantageous further developments and improvements of the method indicated in the main claim are rendered possible by the measures specified in the dependent claims.

It is advantageous, furthermore, if the efficiency is additionally determined as a function of the charge. Taking the charge into account improves the precision of the torque model even further.

An additional advantage consists in the fact that the deviation between an optimum ignition angle and an instantaneous ignition angle is selected as the variable characterizing the combustion center point. When the model is inverted, it allows both the calculation of a setpoint ignition angle at a given setpoint torque and given charge and the calculation of a setpoint charge at a given setpoint torque and given basic ignition-angle efficiency, and also the calculation of the actual torque.

A further advantage is that the efficiency is divided into a first partial efficiency and a second partial efficiency, the first partial efficiency being determined as a function of the variable characterizing the combustion center point and the second partial efficiency as a function of the variable characterizing the opening instant of the discharge-side gas-exchange valve. In this way, a simplified realization is possible if no extremely advanced opening of the discharge-side gas-exchange valve occurs. The efficiency may then be determined as product of the two partial efficiencies.

DETAILED DESCRIPTION

Figure 1:
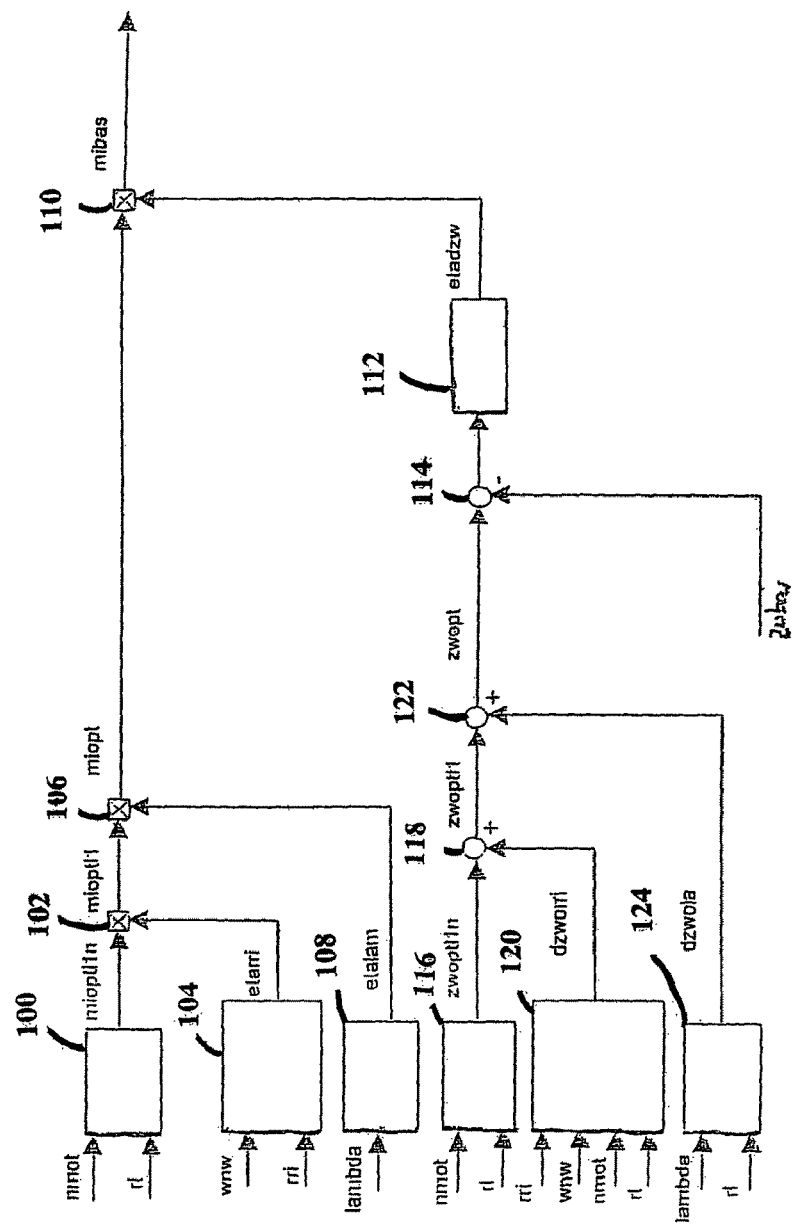
FIG. 1 shows a flow chart of a first specific embodiment of the utilized model.

FIG. 1 shows a flow chart of a first exemplary embodiment for improving the torque model. FIG. 1 describes a program of a microcomputer, the individual elements of the representation in FIG. 1 representing programs, program steps or program parts, while the arrows describe the flow of information. Shown is the calculation of the actual basic torque, i.e., the torque that comes about when setting the basic ignition angle, which is selected from a characteristics map as a function of engine speed and load.

It is essential that in the model shown in FIG. 1 a correction of the optimum torque value takes place in which the inert-gas rate and the charge movement are considered and the optimum ignition angle value is corrected taking the inert-gas rate and the charge movement into account, thus the instantaneous working point.

In a first ignition map 100, a value mioptl1n for the optimum torque is read out as a function of engine speed nmot and actual charge rl, which is determined from the measured air-mass flow taking a suction manifold model into account. The ignition-map values of ignition map 100 are determined under defined, optimal marginal conditions, in particular when the lambda value has a standard value (1, for example), an optimum ignition angle is set and efficiency etarri for the valve overlap (inert-gas rate and charge movement) has a standard value (for example, 1). The optimum torque value is multiplied in a multiplication point 102 with efficiency etarri, which describes the deviation with respect to the valve overlap from the standard value. Efficiency value etarri is formed in ignition map 104 as a function of signals representing an inert-gas rate by internal and external exhaust-gas recirculation, and the charge movement. Proven useful has a signal rri for the internal and external inert-gas rate, which is calculated as a function of the setting of the exhaust-gas return valve and the settings of the intake and discharge valves. The inert-gas rate describes the portion of the inert gas of the total aspirated gas mass. Another way of calculating the inert-gas rate is based on the temperature of the recirculated exhaust-gas flow, lambda, the instantaneous air charge and the exhaust-gas pressure. A signal wnw, which represents the opening angle (relative to the crankshaft or the camshaft) of the intake valve, has shown to be suited for taking the charge movement into account. In other exemplary embodiments, the position of a charge-movement flap or a variable representing the lift and the opening phase of the intake valves is utilized.

As a function of these instantaneous variables, efficiency etarri is determined, which describes the deviations in the torque value, attributable to the inert gas and the charge movement, from the torque value ascertained under standard conditions, on the basis of which ignition map 100 was determined. Optimum torque value mioptl1, formed by the correction in multiplication point 102, is multiplied in a further multiplication point 106 by lambda efficiency etalam. It is ascertained in a characteristic curve 108 as a function of the instantaneous exhaust-gas composition lambda. The result is an optimum torque value miopt, which takes the instantaneous operating state of the internal combustion engine into account as well as its deviation from the standard values, which is used in determining the optimum torque values. Therefore, miopt is the optimum value of the indicated torque at an optimum ignition angle. To form basic torque mibas, from which the instantaneous torque may then be derived, the basic ignition angle setting relative to the optimum ignition angle setting must therefore be taken into consideration. This occurs in multiplication point 110 where optimum torque value miopt is corrected by ignition-angle efficiency etadzw.

Ignition-angle efficiency etadzw is formed from a characteristic curve 112 as a function of the deviation, formed in 114, between basic ignition angle zwbas and optimum ignition angle zwopt. Efficiency etadzw thus determines the effect the deviation of the basic ignition angle from the optimum ignition-angle value has on the torque of the internal combustion engine. The basic ignition angle corresponds to the ignition angle that is read out from a basic ignition angle ignition map as a function of engine speed and load. It does not necessarily correspond to the actually set ignition angle that must be taken into account, in the form of an additional efficiency, when determining the actual torque as a function of the basic torque. The optimum ignition-angle value is read out from ignition map 116 as a function of engine speed nmot and charge rl. The read-out optimum ignition-angle value zwoptl1n is conducted to a node 118 where this value is corrected by correction value dzworri. This correction value is generated in an ignition map 120 as a function of inert-gas rate rri, signal wnw for taking the charge movement into account, and of the signals, engine speed nmot and instantaneous charge rl representing the instantaneous operating point. Optimum ignition-angle value zwoptll corrected in this manner is corrected in an additional node 122 by a correction value dzwola.

It represents a lambda correction value, which is ascertained in ignition map 124 as a function of lambda and instantaneous charge RL. The corrections in nodes 118 and 122 are preferably implemented by addition. This approach has proven suitable since the instantaneous operating point of the internal combustion engine must then be considered in the correction values as well. The value zwopt resulting in 122 represents the optimum ignition-angle value which is compared in node 114 to the basic ignition angle.

The described model satisfactorily controls also the aforementioned operating states having high inert-gas rates and charge movements and small to medium fresh-air charges. It is essential in this context that a correction of the optimum ignition angle and a correction of the optimum torque take place in the torque model. The optimum ignition angle is made up of a basic value as a function of load and engine speed, and additive corrections as a function of the inert-gas rate, the settings of the intake and discharge valves or the valve overlap, of lambda, load and engine speed. The optimum torque is made up of a basic variable as a function of load and engine speed, and multiplicative corrections as a function of the inert-gas rate and the settings of the intake and discharge valves, of lambda and the ignition-angle efficiency with respect to the basic ignition angle.

To determine the model parameters, a software tool is used, which is able to optimize the model parameters from the measured input variables and the measured torque, in such a way that the error square remains as small as possible across the entire measuring points. An example of such a software tool is known from German Published Patent Application No. 197 45 682.

Basic torque mibas ascertained by means of the model is processed further in a variety of ways. Taking the efficiency of the actual ignition-angle setting into account, the instantaneous torque is calculated. Another evaluation consists in determining the ignition-angle setting, the difference between setpoint torque and basic torque being able to be utilized to correct the ignition-angle setting.

The model described in FIG. 1 shows the calculation of the instantaneous torque from various performance quantities. By reversing the model, the model, analogously to the model of the related art mentioned in the introduction, is also used to determine the actuating variables (such as ignition angle, lambda, etc.), as a function of the setpoint torque value or of the deviation between setpoint torque and basic torque or instantaneous torque.

The model may also be formulated as follows:

$$mibas = f1(nmot,rl) * f21(rri) * f22(wnw) * f3(\text{lambda}) * f4(zwopt-zwbas)$$

or, related to the instantaneous torque:

$$miist = f1(nmot,rl) * f21(rri) * f22(wnw) * f3(0) * f4(zwopt-zwist)$$

By reversing the model, it is then possible to derive actuating variables such as an ignition-angle setpoint value zwsoll:

$$zwsoll = zwopt - f4^{-1}[misoll/(f21(rri) * f22(wnw) * f3(0))]$$

The ignition maps and characteristic curves used to calculate the model are determined for each engine type within the framework of the application, possibly using the afore-mentioned software tool.

Figure 2:
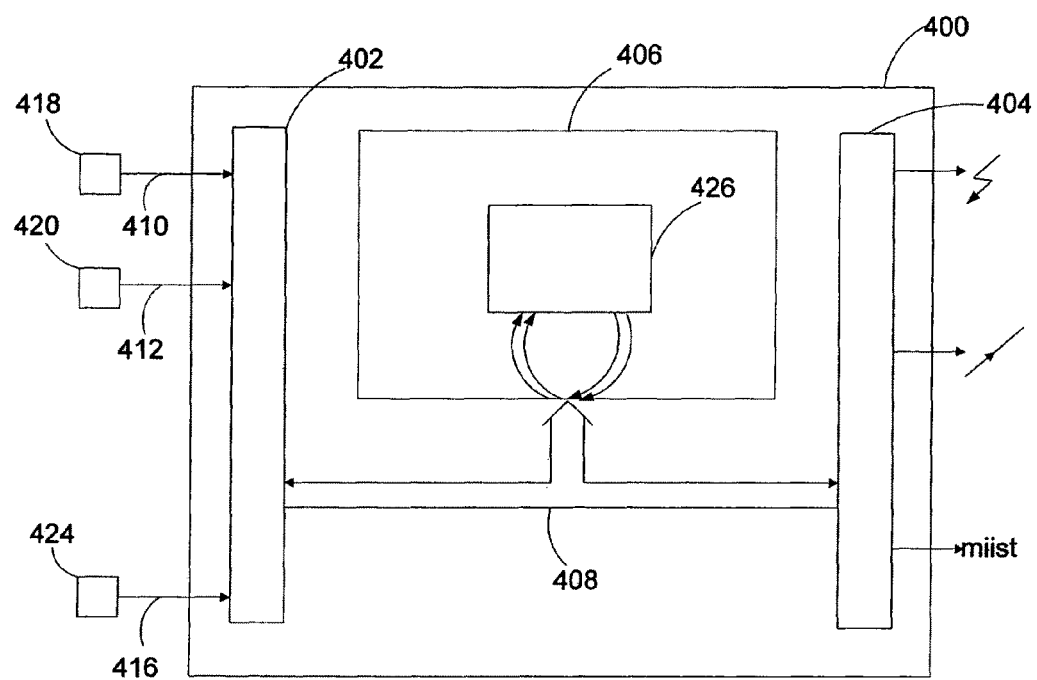
FIG. 2 shows a general diagram of an engine control in which the sketched model is used.

FIG. 2 shows a control unit 400, which includes an input circuit 402, an output circuit 404 and a microcomputer 406. These components are connected to a bus system 408. The performance quantities to be evaluated for the engine control, which are detected by measuring devices 418, 420 through 424, are conveyed via input lines 410 and 412 through 416. The performance quantities required to calculate the model are shown above. The measured and possibly processed performance-quantity signals are then read in by the microcomputer via bus system 408. In microcomputer 406 itself, and there in its memory, the commands used for the model calculation are stored as computer program. This is symbolized in FIG. 2 by 426. The model results, which, if appropriate, are processed further in other programs (not shown), are then conveyed from the microcomputer to output circuit 404 via bus system 408. Output circuit 404 thereupon outputs trigger signals as actuating variables for setting the ignition angle and the air supply, for example, and measured variables, such as instantaneous torque $MI_{ist}$.

Figure 3:
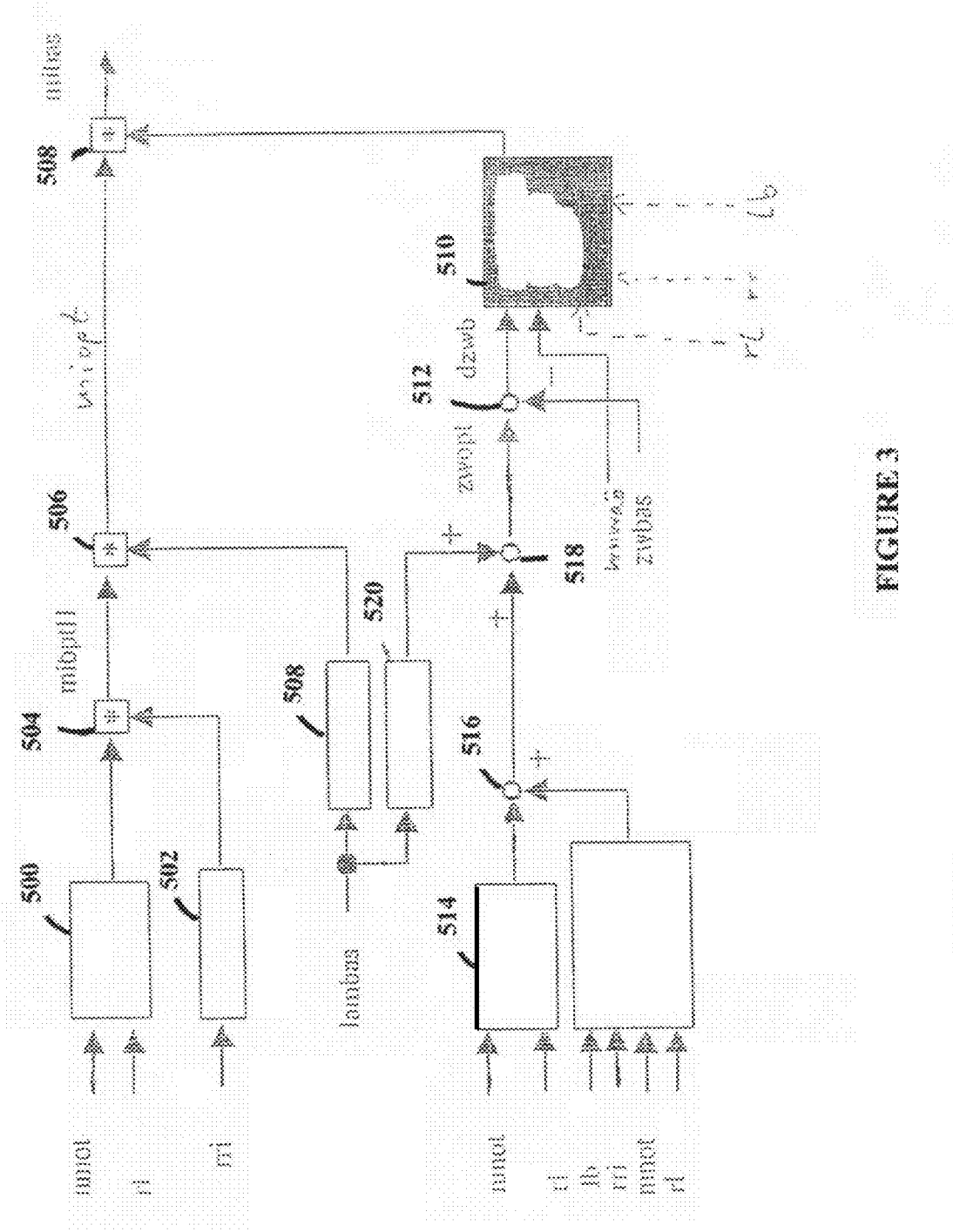
FIG. 3 shows a further exemplary embodiment of the torque model according to the present invention for determining an actual torque.

FIG. 3 shows a flow chart for a torque model, using the aforementioned correlations for a basic operating point. In addition to the difference from optimum ignition angle and basic ignition angle (instantaneous ignition angle), the variable of adjustment angle wnwaö of the camshaft is also entered in block 510 for calculating an extended ignition-angle efficiency, this variable characterizing the opening instant of the discharge-side gas-exchange valve.

As mentioned previously, an efficiency is generated in map 500 as a function of engine speed Nmot and instantaneous charge rl, and in characteristic curve 502 as a function of inert-gas rate rri, the efficiency being multiplied in multiplication point 504 by the optimum torque value, which was formed in map 500 and is optimal under standard conditions. In a multiplication point 506, optimum torque value mioptll determined therefrom is multiplied by a lambda efficiency, which is generated in characteristic curve 508 as a function of basic lambda value lambas, to be set in the given operating point without corrections possibly specified from the outside. The multiplication result in 506 is an optimum torque value miopt and is subjected to a further multiplication in 508 in which optimum torque value miopt is multiplied with ignition-angle efficiency etazwist formed in 510. The result is basic torque mibas for the instantaneous operating point. Analogously to the afore-mentioned representation, the ignition-angle efficiency is determined as a function of the difference, formed in 512, between optimum ignition angle zwopt and basic ignition angle zwbas as well as the directly supplied adjustment angle wnwa of the camshaft. The optimum ignition-angle value is formed in a map 514 as a function of engine speed and charge; this optimum ignition angle is corrected in a summing point 516 as a function of a correction value determined as a function of charge movement LB, inert-gas rate rri, engine speed Nmot and charge rl. In a further correction point 518, the corrected optimum ignition angle is corrected by a correction value that is dependent on a lambda value and which is generated in characteristic curve 520 as a function of the basic lambda value. Optimum ignition-angle value zwopt corrected in this manner is evaluated so as to generate the ignition-angle efficiency in 510 and to determine the instantaneous torque.

The torque model realized according to the flow chart in FIG. 3 is thus also suitable for internal combustion engines having discharge-side gas-exchange valves or discharge valves that have advanced or very advanced opening. On the basis of basic torque mibas, it provides the instantaneous torque as indicated engine torque with high accuracy even with discharge valves having advanced or very advanced opening and retarded ignition angles. An advanced opening of a discharge valve may be achieved, for example, by a corresponding phase shift of the discharge camshaft.

A discharge valve is considered to have advanced opening in this context if it opens prior to reaching bottom dead center of ignition phase ignition-BDC, and to have very advanced opening if it opens even less than a crank angle, or less than a 120° phase shift of the discharge camshaft after TDC of ignition phase ignition-TDC, and thus more than a 60° crank angle prior to reaching BDC of ignition phase ignition-BDC.

Decisive for the conversion of chemical into mechanical energy and thus for generating the indicated torque is the utilization of the heat energy that is released in the course of combustion.

Disregarding the wall-heat losses in the combustion chamber, the opening instant of the individual discharge valve is also decisive for this utilization of the heat energy, in addition to the so-called combustion center point and the progression of the combustion, which is known as fibe function.

The combustion center point is defined in this context as the crank angle at which half of the combustion energy has been converted. The fibe function describes the temporal conversion of the chemical energy over the crank angle.

A very advanced opening of the individual discharge valve leads to a rapid drop in the pressure in the combustion chamber, at a time when the piston is still noticeably moving downward, and thus leads to a lower averaged indicated torque. The portion of the "lost" torque not only depend on the opening instant of the individual discharge valve, that is to say, the crank angle at which the individual discharge valve opens, for instance, but also on other variables.

The combustion center point, in particular, plays a decisive role. In a retarded combustion center point, which is characterized by retarded ignition angles, for instance, the pressure is much higher at a crank angle of 120 degrees after top dead center of ignition phase ignition-TDC, for instance. The working share of the mechanical energy provided during the second half of the downward travel of the piston is greater with retarded ignition angles.

The smaller the charge in the combustion chamber, the lower also the combustion peak pressure and the faster the combustion-chamber pressure drop during the downward travel of the piston. With very small loads, the combustion-chamber pressure falls below the ambient pressure, so that in this case an advanced opening of the individual discharge valve leads to an increase in the indicated torque, since the negative portion of the expansion work is left out.

However, with retarded ignition angles, a maximum indicated torque is obtained even with small charges upon opening of the individual discharge valve at bottom dead center of ignition phase ignition-BDC or shortly before bottom dead center of ignition phase ignition-BDC. However, simulation results have shown that, with respect to the relative variables, there is hardly any change as a function of charge rl. Therefore, charge rl is not necessarily required for considering the losses of an individual discharge valve having advanced opening. However, its consideration would improve the accuracy of the torque model slightly more. For this reason, FIG. 3 provides charge rl as additional input variable in block 510, as a dashed line.

The structure of the torque model described in the not pre-published German Patent Application 101 49 477.7 is broadened here according to the specific embodiment of FIG. 3. In this context, the currently defined ignition-angle efficiency etadzw=f(dzw) is expanded in its importance. It is given an additional dependency on crank angle wnwaö at which the individual discharge valve opens. It therefore describes the overall efficiency of the conversion of chemical into mechanical energy, taking also those losses into account that result from an advanced opening of the individual discharge valve.

Figure 4:
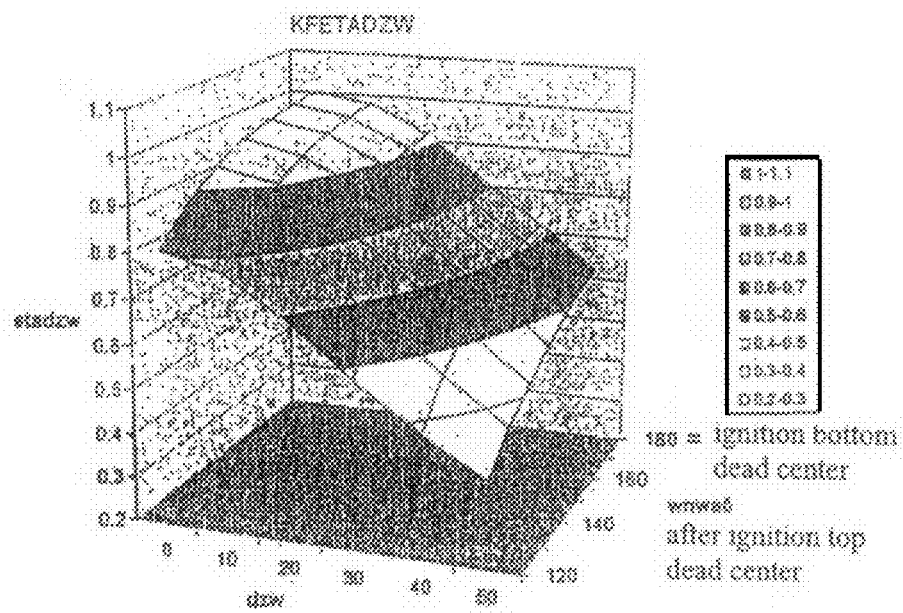
FIG. 4, by way of example, shows a map for determining the efficiency of the conversion of the chemical into mechanical energy.

The flow chart according to FIG. 3 shows an exemplary realization. In contrast to what is known, a characteristic map KFETADZW is now realized in block 510, which determines the overall efficiency etadzw of the conversion of chemical energy into mechanical energy, for instance from crank angle wnwaö at which the individual discharge valve opens und which corresponds to the adjustment angle of the discharge camshaft, and deviation dzw of the ignition angle from its optimum value zwopt at which the greatest induced torque comes about. Characteristic map KFETADZW is shown in FIG. 4 as result of a simulation. The reduction of the indicated torque, i.e., the reduction of overall efficiency etwadzw, is with simultaneous retarding of the ignition, that is, for increasing values of deviation dzw of the ignition angle from its optimum value zwopt, and advancing of the opening instant of the individual discharge valve, i.e, reduction of crank angle wnwö at which the individual discharge valve opens, relative to top dead center of ignition phase ignition-TDC.

Instead of the deviation of the ignition angle from its optimum value zwopt, it is also quite possible to utilize the combustion center point or some other variable as input variable of characteristic map KFETADZW, which describes the position of the combustion over the crank angle.

Instead of adjustment angle wnwaö of the discharge camshaft, it is also possible to use as input variable of characteristic map KFETADZW some other variable characterizing the opening instant of the individual discharge valve.

In a simplified realization, in the event that no extremely or very advanced opening of the discharge valve occurs, the possibility exists, at the expense of accuracy, to reduce characteristic map KFETADZW into the product of two characteristic lines. This corresponds to dividing the overall efficiency into two partial efficiencies. A first partial efficiency is determined as a function of a variable characterizing the combustion center point, i.e., the deviation of the ignition angle from its optimum value zwopt, for example. A second partial efficiency is determined as a function of the variable characterizing the opening instant of the individual discharge valve. The first partial efficiency in these examples therefore is the current pure ignition-angle efficiency, and the second partial efficiency in this example is the efficiency of the opening instant of the respective discharge valve.

For the sake of simplification, the influence of charge rl on the overall efficiency will not be considered in this examination.

Taking charge rl into account would result in a three-dimensional characteristic map. Charge rl may be a fresh-air charge or an exhaust-gas-enriched overall charge provided an external exhaust-gas recirculation is present or the internal exhaust-gas recirculation is of importance. In this case, in addition to charge rl, inert-gas rate rri could also be utilized as input variable for characteristic map KFETADZW, which would then even become four-dimensional or five-dimensional. To be able to consider all influences on the overall efficiency, charge movement 1b could additionally be included as well. In FIG. 3, inert-gas rate rri and charge movement 1b, since optional, are likewise represented as input variables of characteristic map 510 in the form of dashed lines.

Using the improved torque model according to the flow chart of FIG. 3 achieves high precision in the calculation of the indicated torque even in individual discharge valves that have very advanced opening and retarded ignition angles. An advanced opening of the individual discharge valve may be desired to push the hot combustion gases into the exhaust-gas system early on, thereby substantially accelerating the heating of the catalytic converter.

Figure 5:
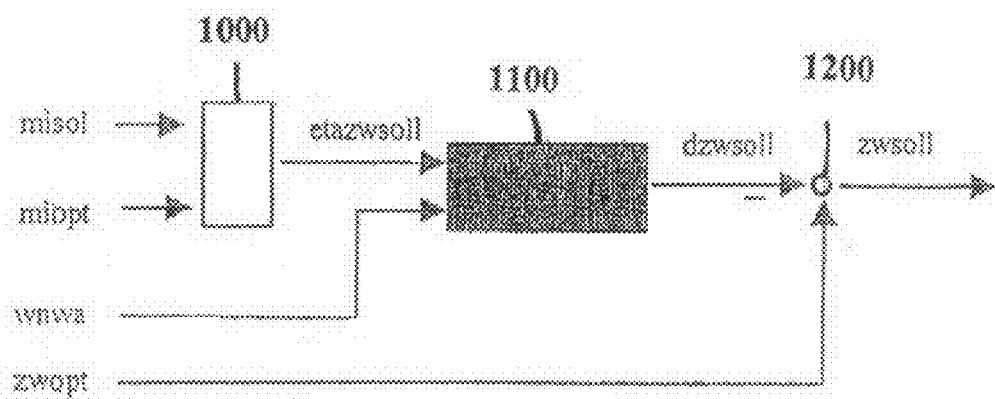
FIG. 5 shows an inverse torque model for calculating a setpoint ignition angle.

The aforementioned torque model according to FIG. 3 must be inverted to calculate the ignition setpoint ignition angle. FIG. 5 shows a corresponding block diagram.

In a block 1000, setpoint value etazwsoll for the expanded ignition-angle efficiency or the overall efficiency is determined by forming the quotient from setpoint torque misoll to be set and optimum torque miopt, using the following formula:

$$etazwsoll=misoll/miopt.$$

Inverse characteristic map 1100, also called KFDZWETA, then receives as input variables setpoint value etazwsoll for the overall efficiency and crank angle wnwaö at which the individual discharge valve opens. Once again, it is optionally possible to transmit to characteristic map KFDZWETA as input variable a value for charge rl, possibly taking inert-gas rate rri and charge movement 1b into account. A deviation dzwsoll of setpoint ignition angle zwsoll from optimum ignition-angle value zwop will then result as output variable. In order to determine setpoint-ignition angle zwsoll, deviation dzwsoll of the setpoint-ignition angle is then deducted from optimum ignition-angle value zwopt in a subtraction point 1200.

What is claimed is:

1. A device for controlling an internal combustion engine, comprising:
   a control device for storing a torque model for the internal combustion engine and including:
      an arrangement for determining, as a function of a setpoint input and according to a torque model, at least one of an instantaneous value and at least one actuating variable;
      an arrangement for providing at least one basic variable within a framework of the torque model, the at least one basic variable being established under a standard condition; and
      an arrangement for correcting the at least one basic variable as a function of a deviation from the standard condition, the at least one basic variable including an optimum torque that is corrected by an efficiency for a conversion of chemical into mechanical energy, wherein the efficiency depends on at least one variable characterizing a combustion center point and a variable characterizing an opening instant of a discharge-side gas-exchange valve.

2. The device as recited in claim 1, wherein the efficiency is determined as a function of a fresh-air charge.

3. The device as recited in claim 1, wherein the variable characterizing the combustion center point is a deviation between an optimum ignition angle and an actual ignition angle.

4. The device as recited in claim 1, wherein the variable characterizing the opening instant of the discharge-side gas-exchange valve is an adjustment angle of a camshaft.

5. The device as recited in claim 1, wherein:
   a first partial efficiency of the efficiency is determined as a function of the variable characterizing the combustion center point; and
   a second partial efficiency of the efficiency is determined as a function of the variable characterizing the opening instant of the discharge-side gas-exchange valve.

6. The device as recited in claim 1, wherein the at least one actuating variable includes a setpoint ignition angle that is determined by inversion of a calculation formula for determining the efficiency.

7. A hardware computer-readable readable medium having stored thereon instructions executable by a processor, the instructions which, when executed, cause the processor to perform a method, the method comprising:
   calculating, as a function of a setpoint input and according to a torque model, at least one of a torque actual value and at least one actuating variable of an internal combustion engine;
   determining, under a predefined standard condition, at least one basic variable of the torque model;
   correcting the at least one basic variable as a function of an actual setting of the internal combustion engine, wherein the correcting includes correcting an optimum torque of the at least one basic variable according to an efficiency for a conversion of a chemical energy into mechanical energy; and
   determining the efficiency at least as a function of a variable characterizing a combustion center point and a variable characterizing an opening instant of a discharge-side gas-exchange valve.

8. The hardware computer-readable readable medium as recited in claim 7, wherein the method further comprises:
   determining the efficiency as a function of a fresh-air charge.

9. The hardware computer-readable readable medium as recited in claim 7, wherein a deviation between an optimum ignition angle and an actual ignition angle is used as the variable characterizing the combustion center point.

10. The hardware computer-readable readable medium as recited in claim 7, wherein an adjustment angle of a camshaft is used as the variable characterizing the opening instant of the discharge-side gas-exchange valve.

11. The hardware computer-readable readable medium as recited in claim 7, wherein:
    a first partial efficiency of the efficiency is determined as a function of the variable characterizing the combustion center point; and
    a second partial efficiency of the efficiency is determined as a function of the variable characterizing the opening instant of the discharge-side gas-exchange valve.

12. The hardware computer-readable readable medium as recited in claim 7, wherein the at least one actuating variable of the internal combustion engine includes a setpoint ignition angle that is determined by inversion of a calculation formula for determining the efficiency.

13. A method for controlling an internal combustion engine, comprising:
    calculating, as a function of a setpoint input and according to a torque model, at least one of a torque actual value and at least one actuating variable of the internal combustion engine;
    determining, under a predefined standard condition, at least one basic variable of the torque model;
    correcting the at least one basic variable as a function of an actual setting of the internal combustion engine, wherein the correcting includes correcting an optimum torque of the at least one basic variable according to an efficiency for a conversion of a chemical energy into mechanical energy; and
    determining the efficiency at least as a function of a variable characterizing a combustion center point and a variable characterizing an opening instant of a discharge-side gas-exchange valve.

14. The method as recited in claim 10, further comprising:
determining the efficiency as a function of a fresh-air charge.

15. The method as recited in claim 13, further comprising:
selecting a deviation between an optimum ignition angle and an actual ignition angle as the variable characterizing the combustion center point.

16. The method as recited in claim 13, further comprising:
selecting an adjustment angle of a camshaft as the variable characterizing the opening instant of the discharge-side gas-exchange valve.

17. The method as recited in claim 13, further comprising:
dividing the efficiency into a first partial efficiency and into a second partial efficiency;
determining the first partial efficiency as a function of the variable characterizing the combustion center point; and
determining the second partial efficiency as a function of the variable characterizing the opening instant of the discharge-side gas-exchange valve.

18. The method as recited in claim 13, wherein:
the at least one actuating variable of the internal combustion engine includes a setpoint ignition angle that is determined by inversion of a calculation formula for determining the efficiency.

\* \* \* \* \*